H. LAULA.
SEWING MACHINE FOR MAKING THREAD BUTTONS.
APPLICATION FILED JAN. 18, 1910.

1,105,354.

Patented July 28, 1914.
12 SHEETS—SHEET 2.

Witnesses.
R. May Duvall
B. B. Collings.

Inventor.
H. Laula,
By Wilkinson, Fisher & Witherspoon
Attorneys

H. LAULA.
SEWING MACHINE FOR MAKING THREAD BUTTONS.
APPLICATION FILED JAN. 18, 1910.
1,105,354.
Patented July 28, 1914.
12 SHEETS—SHEET 3.
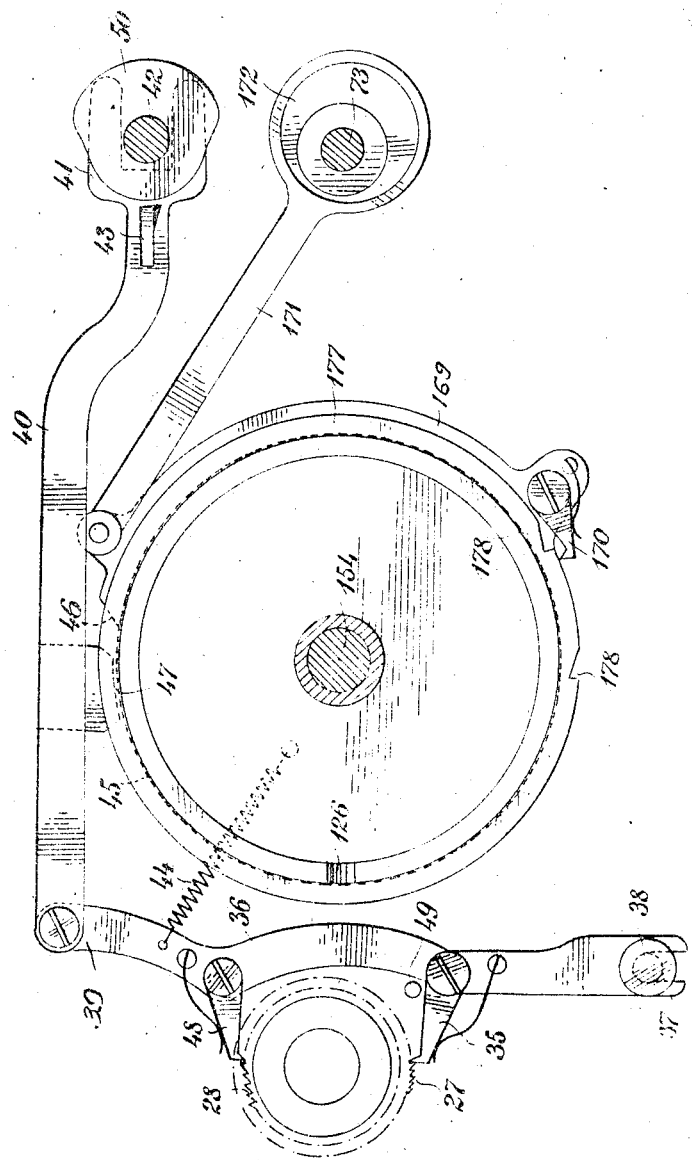

Figure 5:
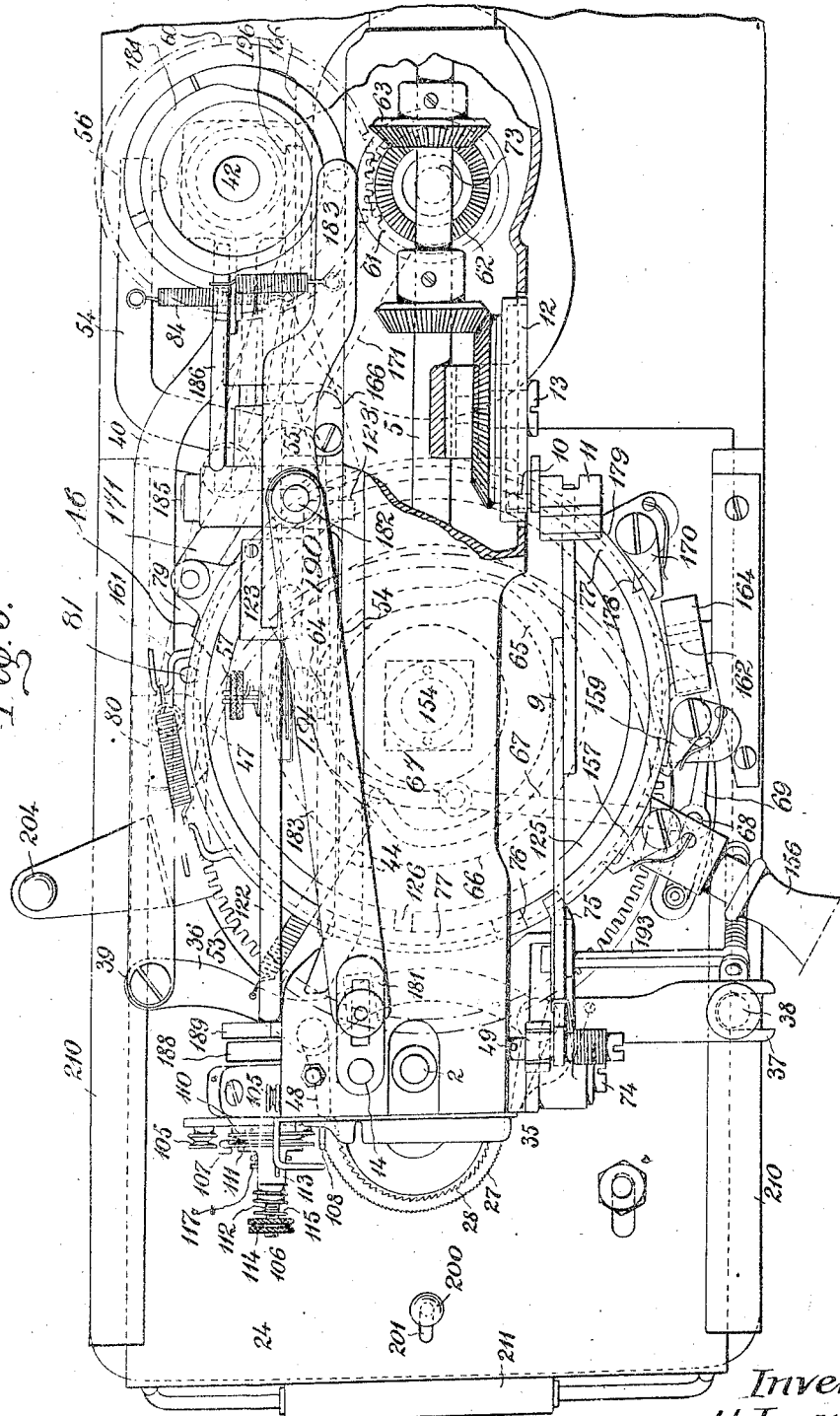

H. LAULA.
SEWING MACHINE FOR MAKING THREAD BUTTONS.
APPLICATION FILED JAN. 18, 1910.
1,105,354. Patented July 28, 1914.
12 SHEETS—SHEET 4.
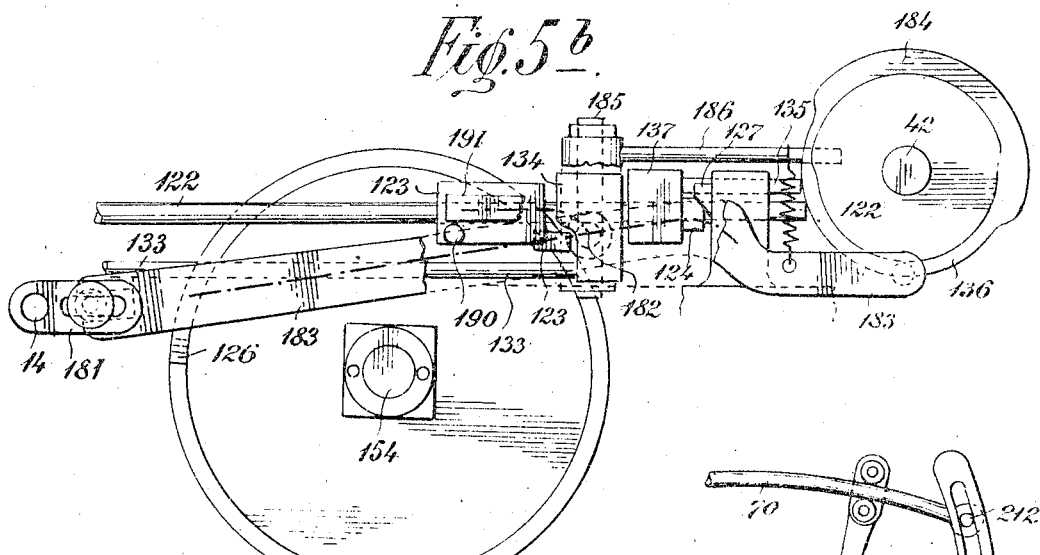
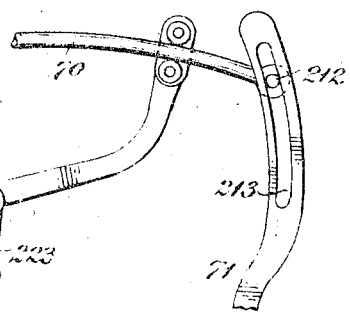
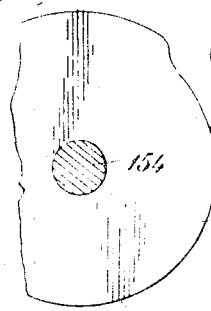
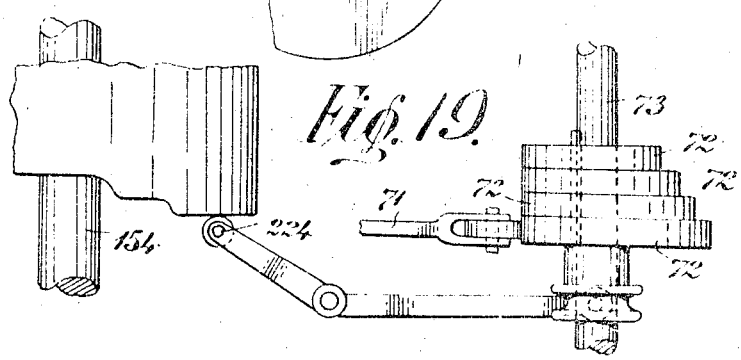
Witnesses.
Inventor:

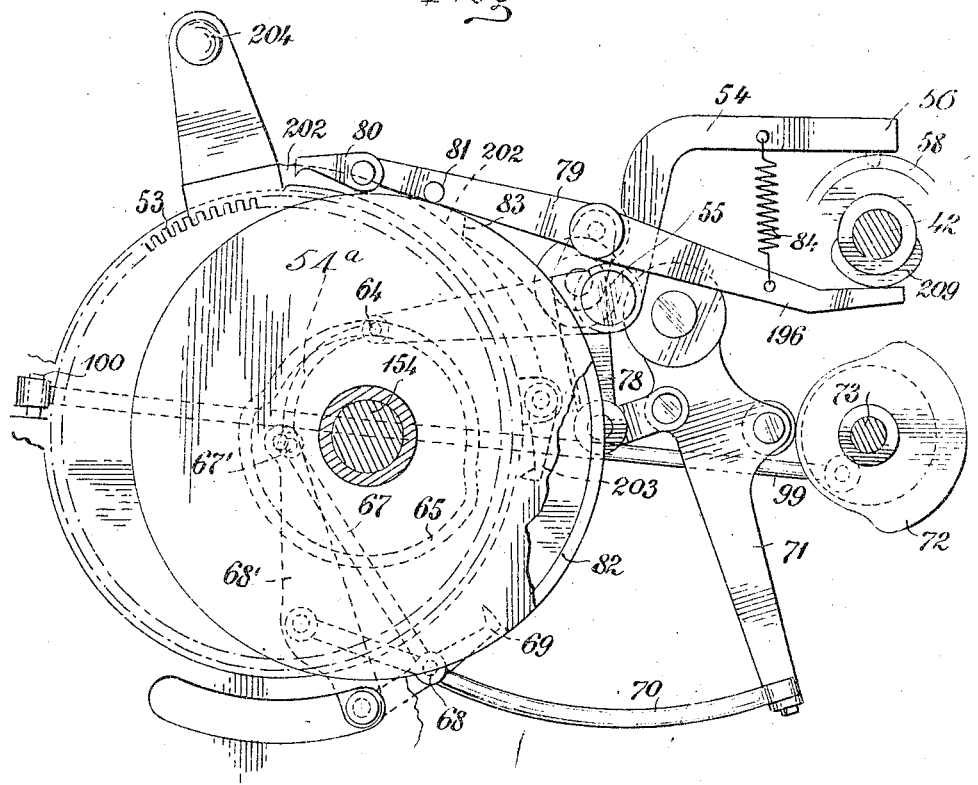
Fig. 5.c

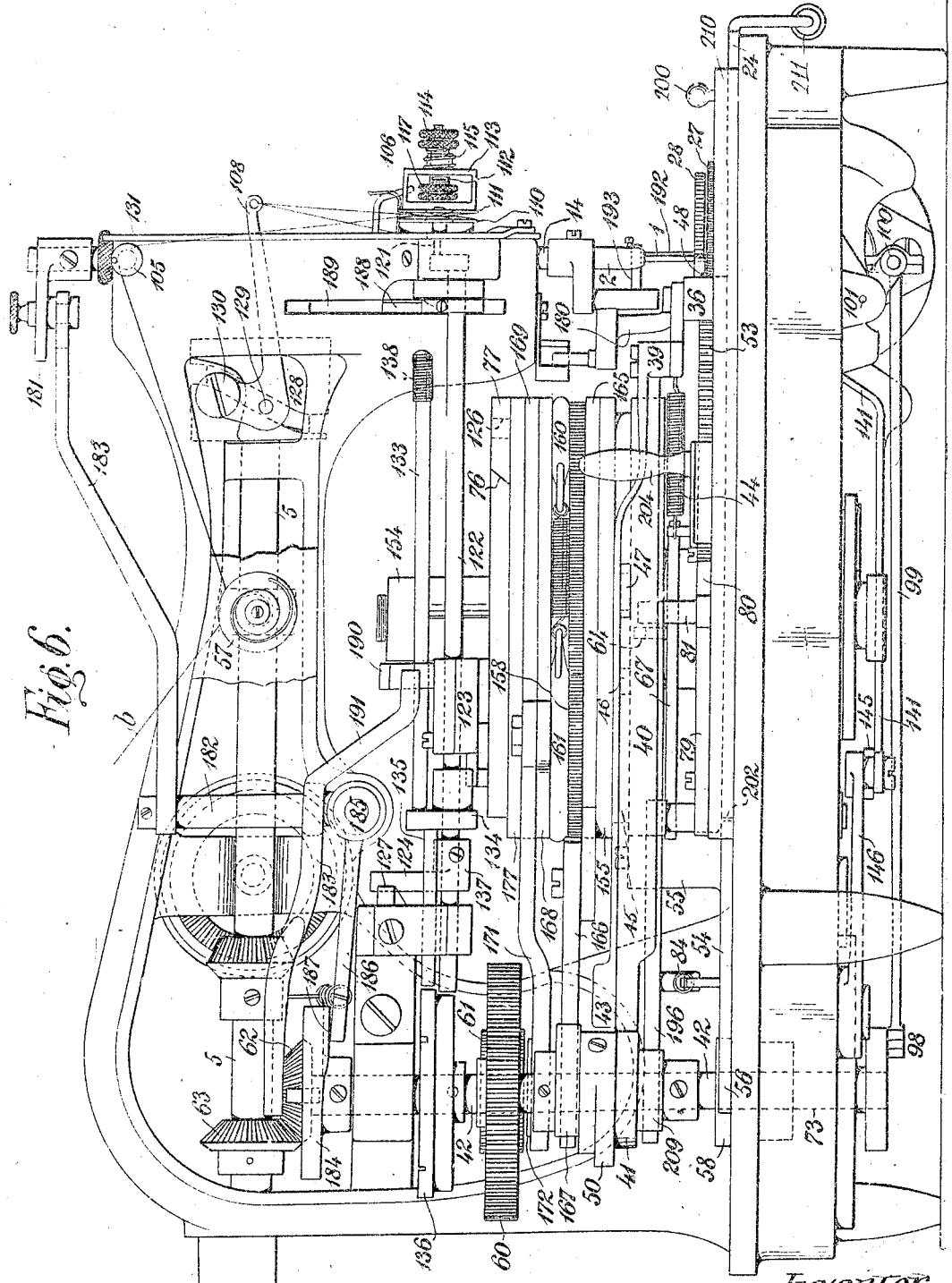

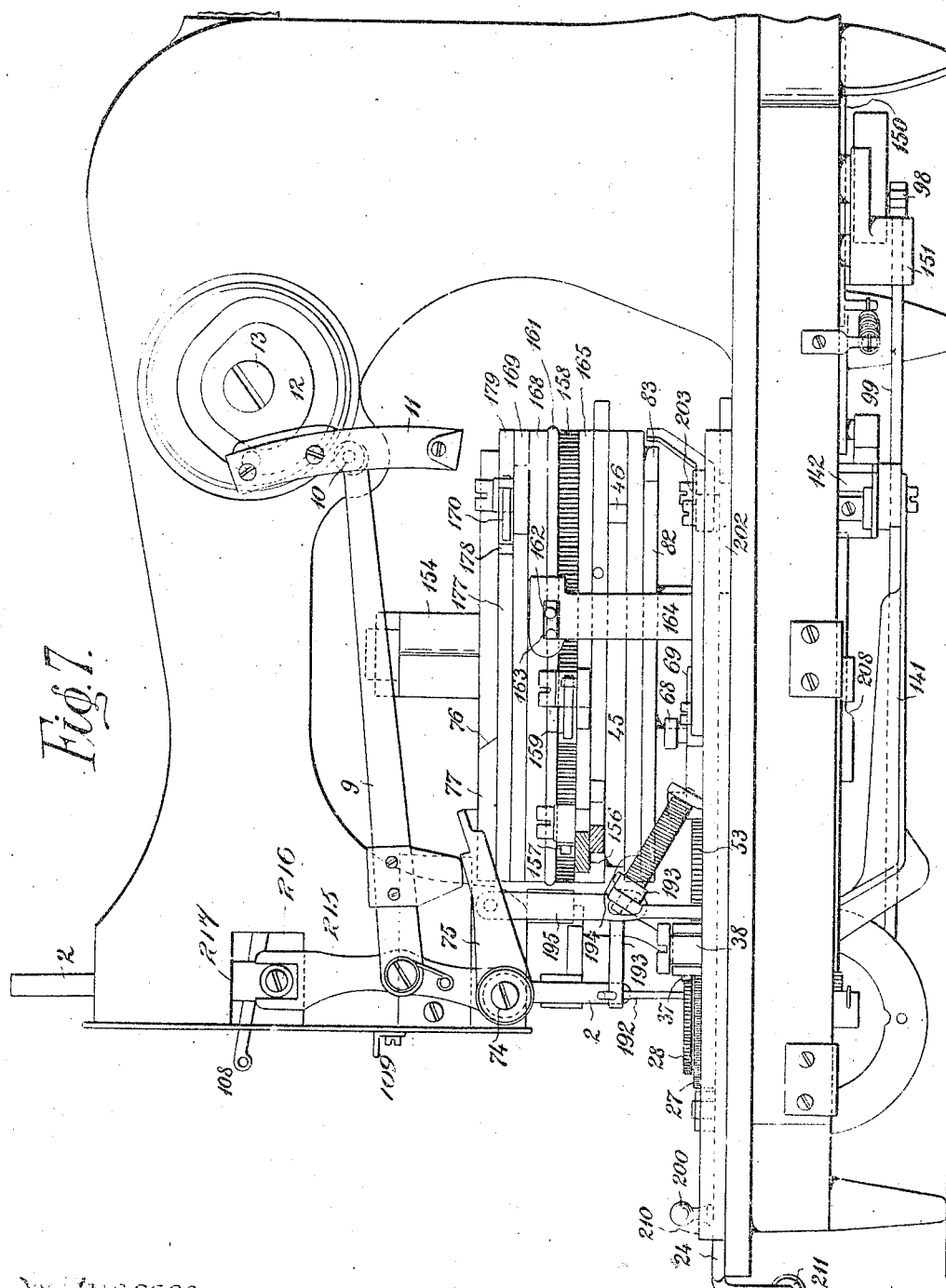

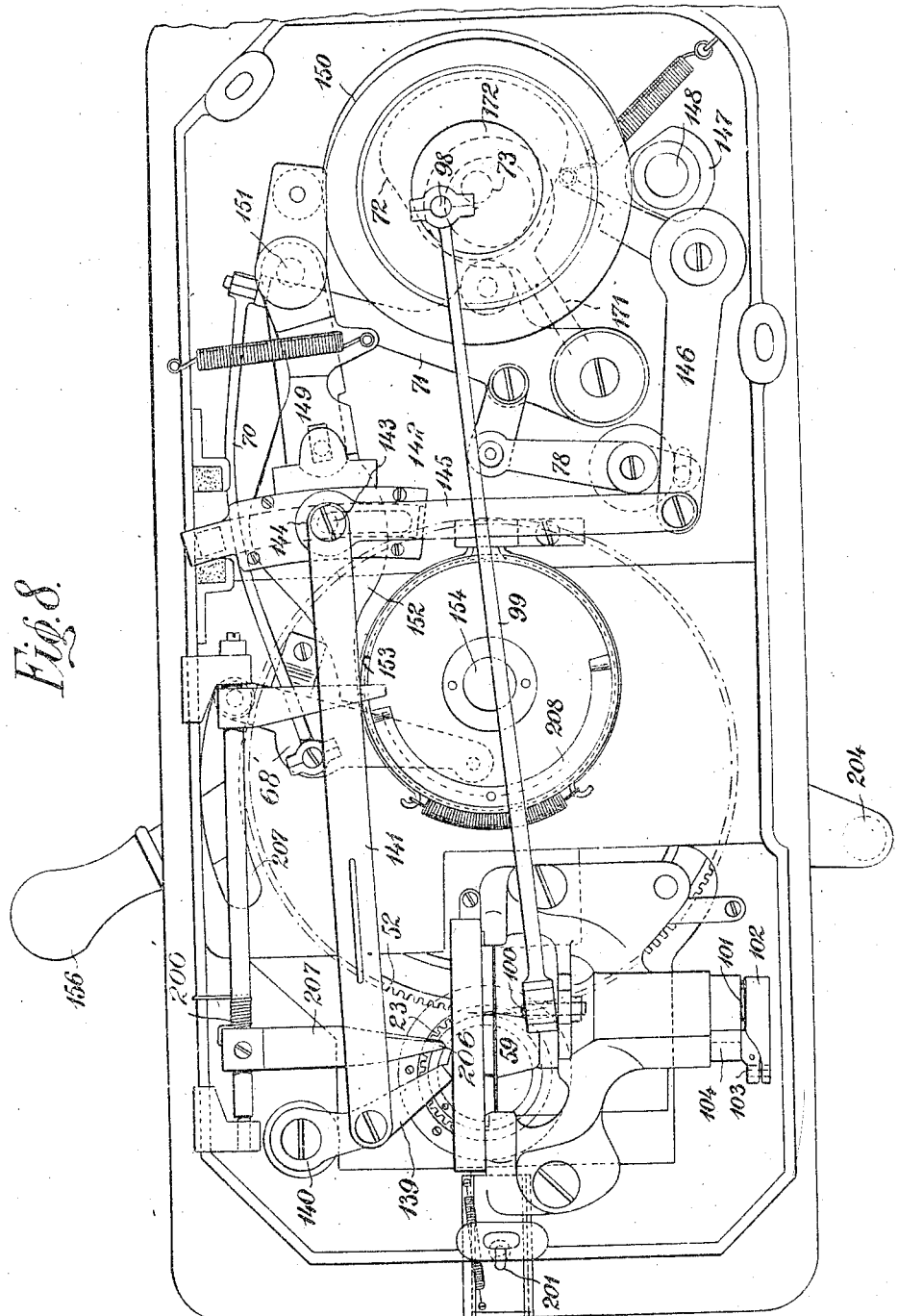

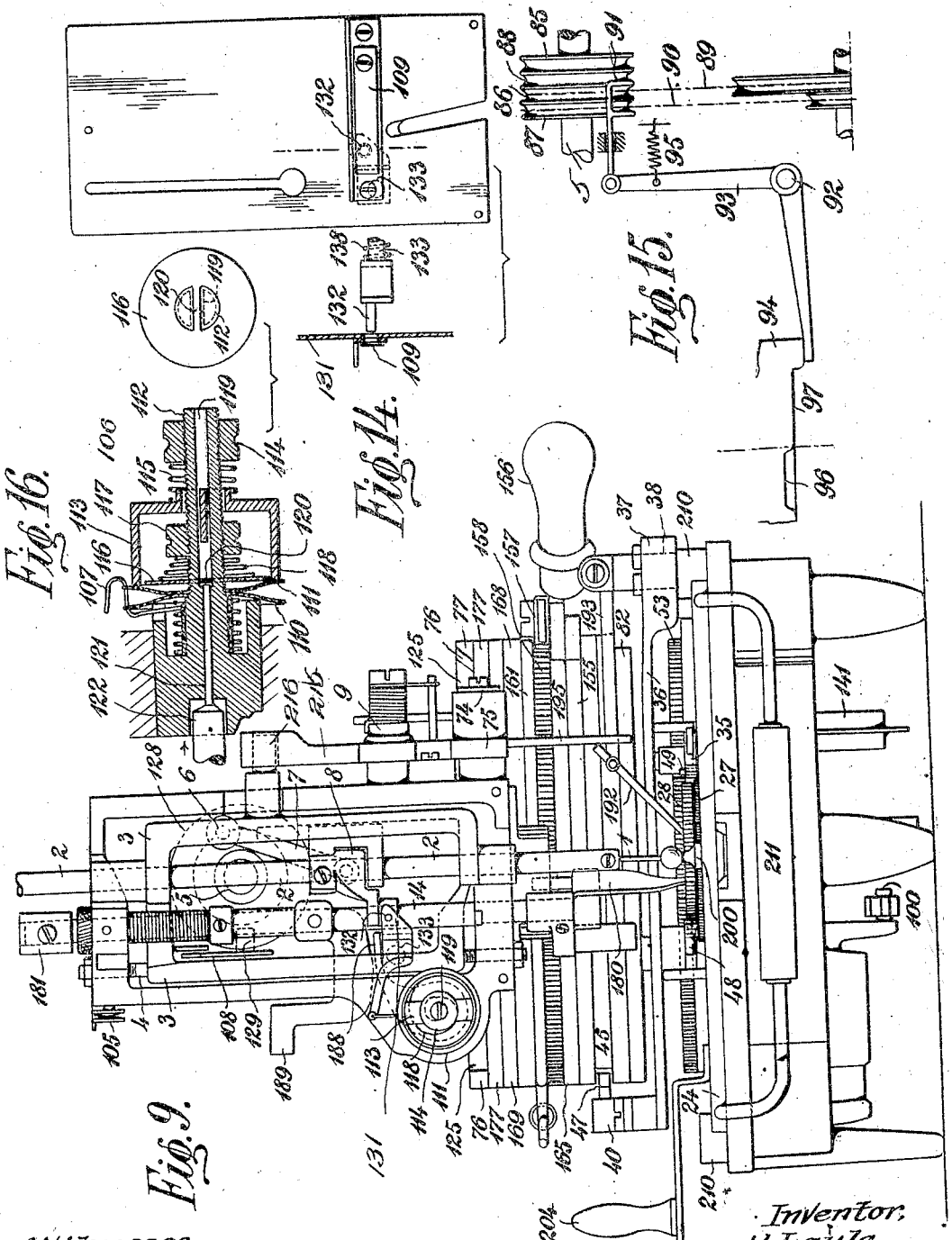

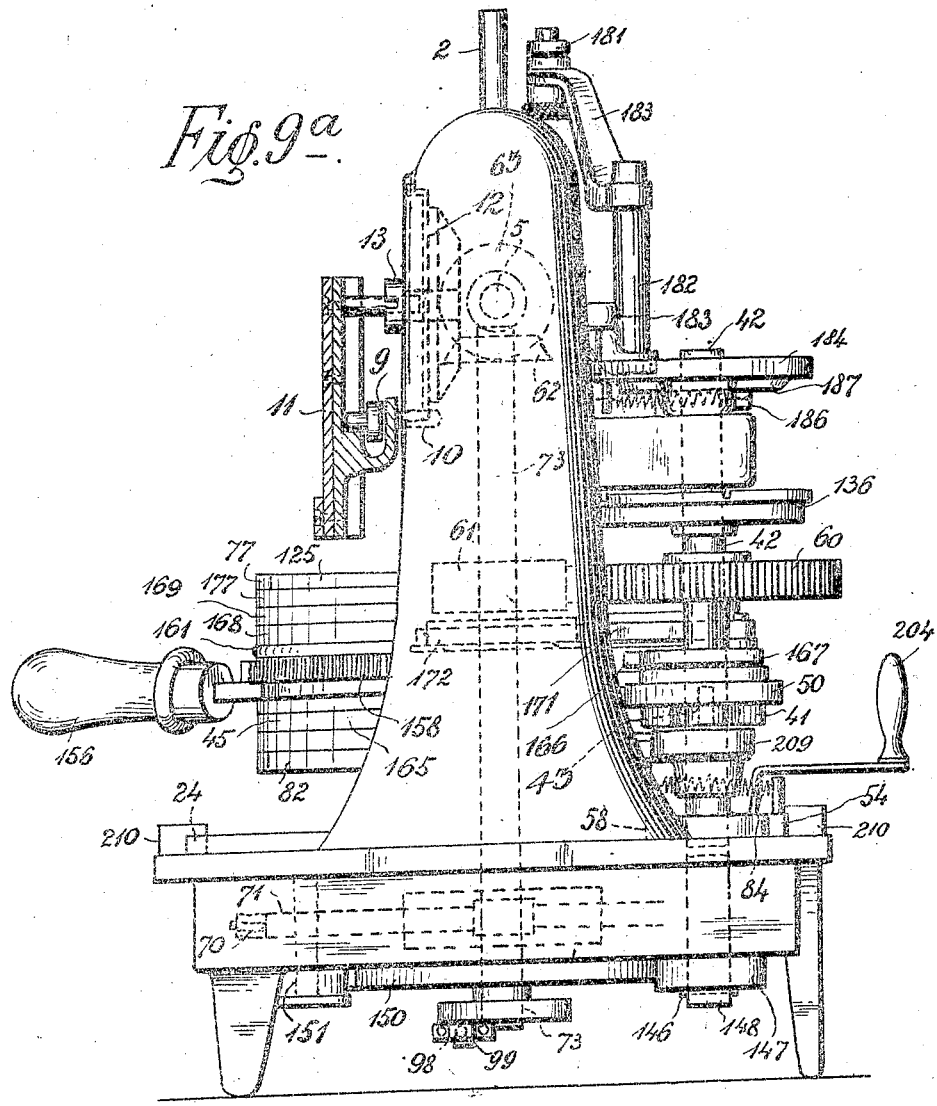

H. LAULA.
SEWING MACHINE FOR MAKING THREAD BUTTONS.
APPLICATION FILED JAN. 18, 1910.
1,105,354.  Patented July 28, 1914.
12 SHEETS—SHEET 11.
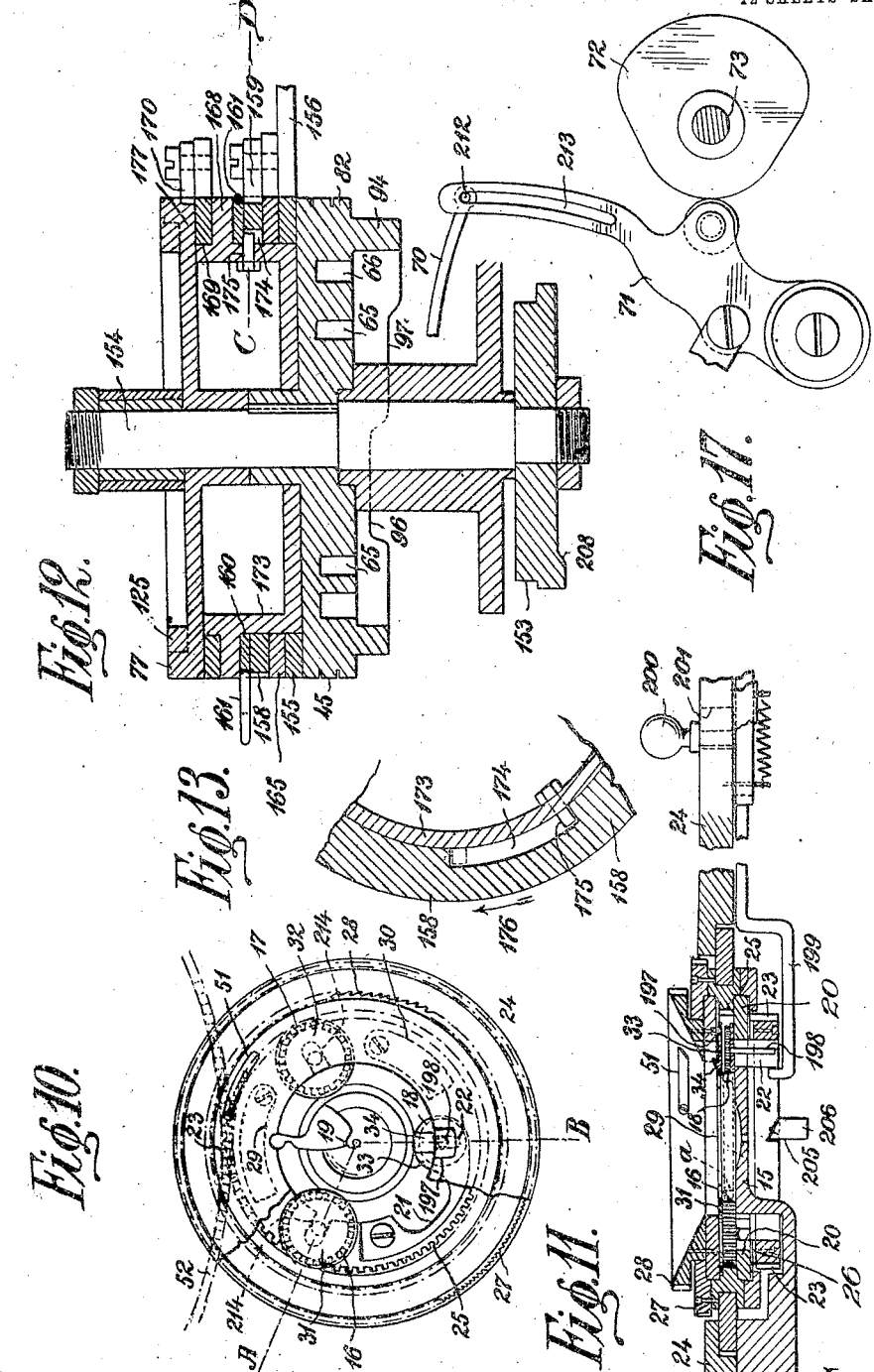

H. LAULA.
SEWING MACHINE FOR MAKING THREAD BUTTONS.
APPLICATION FILED JAN. 18, 1910.
1,105,354.
Patented July 28, 1914.
12 SHEETS—SHEET 12.
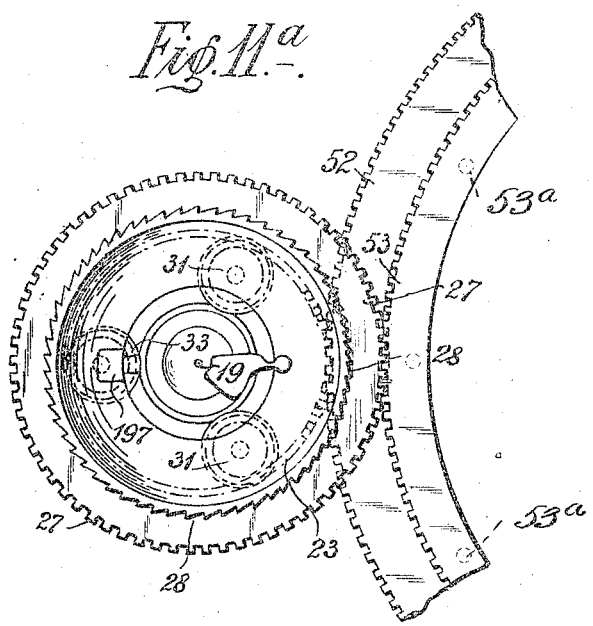
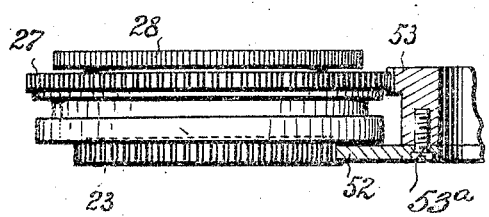

UNITED STATES PATENT OFFICE.

HEINRICH LAULA, OF VIENNA, AUSTRIA-HUNGARY.

SEWING-MACHINE FOR MAKING THREAD BUTTONS.

1,105,354.  Specification of Letters Patent.  Patented July 28, 1914.

Application filed January 18, 1910. Serial No. 538,702.

*To all whom it may concern:*

Be it known that I, HEINRICH LAULA, a subject of the Emperor of Austria-Hungary, residing at Vienna, Empire of Austria-Hungary, have invented certain new and useful Improvements in Sewing-Machines for Making Thread Buttons; and a do hereby declare the following to be a full, clear, and exact description of the invention, such as will enable others skilled in the art to which it appertains to make and use the same.

This invention relates to sewing machines and has for its object to provide a lock stitch sewing machine for making thread buttons by the process disclosed in my prior application filed June 16th 1909, Ser. No. 502,596.

Figure 1:
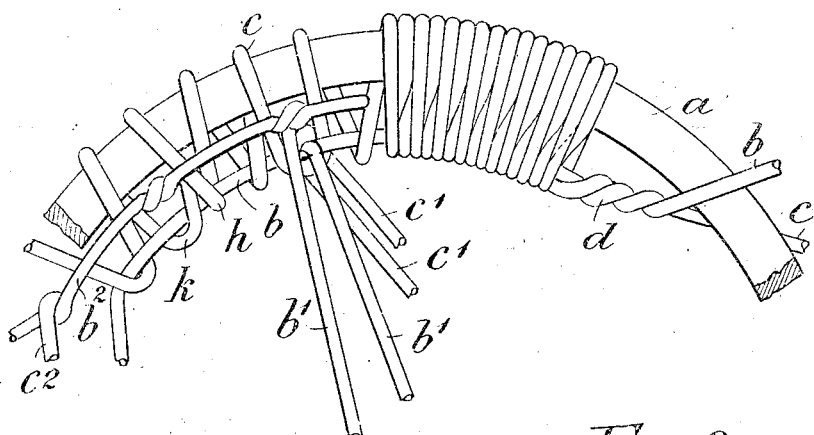
Figures 2, 3:
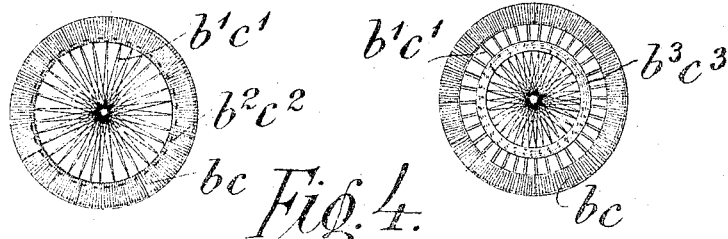
Figure 4:
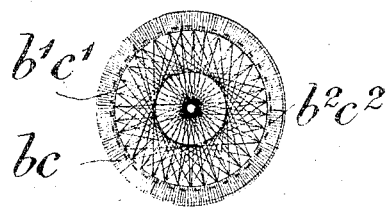

In the accompanying drawings: Figure 1 is a plan view on a large scale of part of a thread button made by means of the present machine illustrating the various stages of manufacture. Figs. 2, 3 and 4 show on a smaller scale finished buttons of various designs. Fig. 5 is a plan view, Figs. $5^a$, $5^b$ and $5^c$ show separately parts of Fig. 5, Figs. 6 and 7 are side elevations viewed from opposite sides of the machine, Fig. 8 is a bottom view and Fig. 9 a front view of the machine, in Fig. 9 the front plate of the needle casing is removed. Fig. $9^a$ is a left hand elevation, partly in section, of the construction shown in Fig. 6. Figs. 10 and 11 show on a larger scale a plan view and a section on the line A B, Fig. 10 respectively of the mechanism for holding and rotating the ring. Fig. $11^a$ is a fragmentary plan view of the toothed rings 52 and 53 and the parts coöperating therewith. Fig. $11^b$ is a fragmentary radial section through the toothed rings 52 and 53 with the coöperating parts shown in elevation. Fig. 12 is a vertical section of the controlling shaft and the cams and wheels mounted thereon. Fig. 13 is a section on the line C, D, Fig. 12 showing a detail. Fig. 14 is a detail view of the needle thread clamp. Fig. 15 is a side elevation of the mechanism for automatically changing the speed of the machine and for stopping the latter. Fig. 16 shows on a larger scale a vertical section of the needle thread brake. Fig. 17 shows a mechanism for varying the step of the intermittent rotation of the ring for producing the star shaped design. Figs. 18 and 19 illustrate modifications hereinafter referred to.

For fully understanding the present machine a short description of the process disclosed in my said prior application filed June 16th 1909, Ser. No. 502,596 is indispensable. In this process the ends of the needle thread $b$ and the shuttle thread $c$ are first suitably fastened and then a few stitches are made whereby the needle thread and the shuttle thread are twisted around each other as shown on the right hand side of Fig. 1 at $d$. Then besides the up and down movement, also a vibrating movement radially to the ring $a$ is imparted to the needle so that it descends alternately on the inside and on the outside of the ring in a manner similar to that common in button hole sewing machines. The shuttle thread loops formed on the descent of the needle outside the ring are drawn by properly tightening the needle thread over the top side of the ring to its inside while the shuttle thread loops formed on the descent of the needle inside the ring are left on its inside. The ring is intermittently rotated around its geometrical axis (by one step at alternate stitches) and this is continued until the ring has made a complete revolution. In this way a covering is formed on the ring in which the needle thread runs along a circle within and substantially concentric to the ring while the shuttle thread loops run from one point of concatenation with the needle thread over the top side of the ring down its outer side, below its underside and back to the next following point of concatenation with the needle thread inside the ring. This covering is shown on the right hand side of Fig. 1 as it appears in the finished button, on the left hand side of Fig. 1 the shuttle thread loops are shown drawn apart for the sake of clearness. When the ring approaches the end of the first revolution the end portion $d$ formed by twisting around each other the two threads, is also inclosed by the covering. After completing the covering *i. e.* after the ring has made substantially one complete revolution the radially vibrating movement of the needle is stopped so that the needle moves up and down only inside the ring but outside the circle formed by the needle thread inside the ring and concentric thereto and locking the shuttle thread loops of the covering. The intermittent rotation of the ring around its geometrical axis is so changed that the ring is turned at each stitch by a multiple of a fraction of a complete revolution, that is to say by $$\frac{m.360°}{n}$$

$m$ and $n$ being relative prime whole members, $n$, being greater than $m$, for instance, $$\frac{15.360°}{32}$$

and always in the same direction. The step of the ring in this stage of the manufacture is usually somewhat less than 180°. Thereby stitches are formed in which the needle thread $b'$ is above the shuttle thread $c'$ and both run from one point of the ring to another which is distant from the first point by somewhat less than 180°, these stitches being locked by the circular needle thread $b$ of the covering as shown on the left hand side of Fig. 1. These stitches form a star shaped design which is completed after a certain number of complete revolutions of the ring (such number being determined by the step of the ring) and then fills the inside of the ring as shown in Fig. 2. Then the step of the intermittent rotation of the ring is reduced but the needle continues to move up and down only stitching through the covering between the outer points of the star shaped design and the ring and the ring is caused to make a complete revolution. Thereby a line of stitches $b^2 c^2$ is formed running completely around inside the ring as shown on the left hand side of Fig. 1. The button is then ready for use in many cases but one or more circular lines of stitches $b^3 c^3$ may be produced inside the outer points of the star shaped design or another star shaped design having a different step and overlapping the design $b' c'$ may be added as shown in Figs. 3 and 4 respectively.

The machine serving for manufacturing the buttons hereinbefore described by the process set forth is a lock-stitch machine and the constructional form of the machine shown by way of example in Figs. 5 to 17 is one in which the various movements of the needle and of the ring from the beginning of making the button up to the stopping of the machine after finishing the button are brought about automatically throughout.

Referring now more particularly to Figs. 5 to 17 1 is the needle, 2 is the needle-bar (Fig. 9) carried as usual by a frame 3, oscillating around an axis 4 parallel to the needle-bar. The latter is reciprocated vertically by a shaft 5 through the medium of a crank 6, and a connecting-rod 7. The frame 3 is oscillated around the axis 4 by means of a lever 215 fulcrumed on the machine and engaging by means of a slot 217 a pin 216 on the frame or needle gate 3. The lever 215 is actuated by a link 9 pivoted at one end to said lever and engaging at its other end a slotted lever 11, which latter is pivoted at 10 to the machine frame and operated by a cam 12 on a continuously revolving shaft 13, whereby said link can be adjusted in the slotted lever 11 to vary the stroke of said link and the oscillation of the needle gate 3. If, for example, as shown in Figs. 7 and 9ª, the end of the link 9 engages the slotted lever 11 directly in line with the fulcrum 10 of said lever, the needle gate will not be oscillated at all. On the other hand, by adjusting the link 9 upwardly in the slotted lever 11, as hereinafter described, the needle gate 3 will be oscillated with an amplitude proportionate to such upward adjustment of said link. The sleeve 8, on which the connecting-rod 7 acts is guided by the presser-foot-bar 14. The movements of the shaft 5 and shaft 13 and the arm 9 are so timed that during the first revolution of the ring $a$ that is to say when the covering is being made, the arm is moved after each up and down movement of the needle-bar for rocking the frame 3 whereby the needle-bar is vibrated radially to the ring $a$ so that the needle stitches alternately at the inside and outside of the ring.

The ring $a$ is placed upon a disk 15 fast in the cloth-plate 24 (Figs. 10 and 11) and is there held in position by two toothed wheels 16, 17 and a pressing wheel 18 that is applied against the ring by a spring 21. The disk is also provided with a needle-hole 19 and is inclosed by a button-feed-disk 20 in which the toothed wheels 16 17 are journaled and on which the spring 21 for the pressing wheel 18 is secured. The journal pin 198 of the pressing-wheel is adjustable in a radial slot 22 of the button-feed-disk 20 and at the bottom of the latter there is provided a pinion 23. Above the button-feed-disk an internally toothed wheel 25 is journaled in the cloth-plate 24 and between the button-feed-disk and the wheel 25 there is provided a frictional coupling 26 (or clutch) preferably consisting of a leather washer interposed between the button feed disk and the wheel 25. The latter engages into the wheels 16 and 17 and has secured to it at its upper side a ratchet wheel 27 in which another concentric ratchet wheel 28 is free to revolve. Springs 29, 30 secured to the button-feed-disk 20 hold the ratchet wheel 28 against the ratchet-wheel 27 so that the former is coupled with the latter and with the button-feed-disk by friction.

On the wheels 16 and 17 there are loosely laid plain disks 31, 32 which project beyond the periphery of the said wheels and partly overlap the ring *a* for preventing it from rising. A similar disk 33 is placed loosely on the pressing wheel 18, and is provided at its top side with a projection 34. Into the ratchet wheel 27 hereinafter called the covering feed ratchet there engages a pawl 35 on a lever 36 (see also Figs. 5, 5ª and 6) the said lever being mounted at its slotted end 37 on a pin 38 fast in the frame of the machine and having its other end 39 pivotally connected with one end of a rod 40. The other forked end 41 of the rod 40 embraces a shaft 42 carrying a cam 50 engaging with a projection 43 on the rod 40 so that at each revolution of the shaft 42, that is to say, for each pair of stitches the rod 40 is advanced once and is then returned by a spring 44 acting on the lever 36. Into the ratchet wheel 28, hereinafter called the clamp wheel, there engages another pawl 48 on the lever 36 in such position that the two pawls 35 and 48 act on opposite sides of the oppositely toothed ratchet wheels 27 and 28 and thus turn these two wheels in opposite direction when engaging the same and actuated by the lever 36. When the button-feed disk 20 and the pinion 23 are locked while the shaft 42 is revolved as is the case during the first revolution of the ring *a* in making the covering of the said ring, the covering feed ratchet 27 is turned step by step by the pawl 35 whereby the internally toothed wheel 25 is revolved which through the medium of the toothed wheels 16 and 17 journaled in the button-feed-disk causes the ring *a* to turn step by step, the said ring being held against the wheels 16 and 17 by the pressing wheel 18. The direction of the rotation of the ring is then opposite to that of the wheel 25. At the same time the clamp-wheel 28 is rotated step by step by means of the pawl 48 in a direction opposite to that of the covering-feed-ratchet 27 that is to say in the same direction as the ring *a* sliding over the springs 29, 30 and overcoming the friction. The number of teeth on the wheels 27, 28 is so determined, regard being had to the positions of the pawls 35 and 48, that the clamp wheel 28 and the ring *a* move simultaneously and with the same angular velocity. This permits the fastening of the loose thread ends on the wheel 28 as for instance by a spring-clamp 51 without any risk of the said threads interfering with the movement of the wheel. The shaft 42 is geared by spur wheels 60 and 61 to a shaft 73, which latter is provided with a bevel gear 62 meshing with a bevel gear 63 on the shaft 5; said gears being so proportioned that the shaft 42 makes one revolution for two revolutions of the shaft 5. The rod 40 is provided with a projection 47 (see also Fig. 9) which comes into engagement with an incline 46 of a cam 45 mounted on a controller shaft 154 which latter is suitably journaled in the frame of the machine and is operated from the shaft 73 by hereinafter described mechanism. When the ring *a* has made a complete revolution and in so doing has been provided with the covering composed of shuttle-thread-loops as hereinbefore described, the projection 47 is acted upon by the said incline 46 whereby the rod 40 is displaced about the shaft 42 as an axis and thereby so displaces the lever 36 that the pawl 48 comes out of engagement with the clamp wheel 28. The pawl 35 strikes then against a pin 49 fast on the cloth-plate and is thus brought out of engagement with the covering feed ratchet 27. During this first revolution of the ring *a* the arm 9 is at the bottom end of the slot of the lever 11 Figs. 7 and 9, so that the frame 3 oscillates around the axis 4 and the needle descends alternately inside and outside the ring *a* whereby the covering is formed on the ring as above set forth. At the same time as the pawls 35 and 48 are thrown out of engagement with their ratchet-wheels, the arm 9 is raised by an arm 75 pivoted in the frame of the machine at 74 to such an extent that the end of the arm 9 engaging into the slot in the lever 11 comes opposite the fulcrum 10 of the latter. This movement of the arm 75 is brought about by an incline 76 on a cam 77 on the controller shaft 154. Thereby the oscillations of the frame 3 are stopped and the needle moves up and down only inside the ring *a* between the body of the latter and the circle formed by the needle-thread *b* locking the shuttle-thread loops inside the ring as above explained.

The pinion 23 engages into a toothed-ring 52 concentric with and rigidly secured to another toothed ring 53 in any suitable manner, as by bolts or rivets 53ª (Figs. 5 8 11ª and 11ᵇ).

55 is the pivot of a lever 54 (see also Fig. 5ᶜ) the outer end 56 of which is opposite a cam 58 on the shaft 42 (see also Fig. 6). A pin 64 mounted on the inner arm of the lever 54 engages into a cam groove 65 in a disk 66 on the controller shaft 154, said inner arm being shown provided with a curved prolongation 54ª pivotally connected to one end of a rod 67, the other end of which rod is pivotally connected at 68 to a pawl 69. This pawl is pivoted to an arm 68' journaled in the center of the toothed wheel 53. The cam-groove 65 is so shaped that after completing the first revolution of the ring *a*, that is to say, when the cam 45 so moves the rod 40 that the pawls 35, 48 come out of engagement with the wheels 27, 28, the pin 64 on the inner lever arm 54 is so actuated that the curved extension 54ª of said lever shifts the pivotal connection 67' between said lever extension and the rod 67 into the center of the toothed ring 53, thus causing the pawl 69 to engage into the teeth of the said toothed ring while before such moment the said pawl had been kept out of engagement with the toothed ring 53 by the rod 67, as shown in Fig. 5ᶜ. The pawl 69 or the arm 68' is pivotally connected to one end of a rod 70, Figs. 8 and 5ᶜ, the other end of which is pivotally connected with a lever 71 pivoted in the frame of the machine and acted upon by a cam 72 on the shaft 73 carrying also the bevel-wheel 62. On disengaging the pawls 35, 48 the pawl 69 comes into engagement with the toothed ring 53 and turns the same step by step, the said pawl being reciprocated by the coöperation of the lever 71 and the cam 72. In this way the button-feed-disk 20 is directly rotated by the pinion 23 and the toothed-ring 52 the frictional coupling 26 causing the internal toothed wheel 25 and the covering feed ratchet 27 and the springs 29, 30 causing the clamp-wheel 28 to rotate with the button-feed-disk. During this part of the operation of the machine the star-shaped design above described is made. The pawl 69 turns the toothed ring 53 step by step the individual steps being so determined that the button-feed-disk and the ring are turned at each stitch through the required angle which in all cases is a multiple of a fraction of a complete revolution i. e.

$$\frac{m.360°}{n}$$

as above explained and in most cases nearly 180 degrees, for instance 15/32 of a revolution or 168 3/4 degrees. Of course the ring is in this part of the operation of the machine turned always in the same direction. After a certain number of steps making up a plurality of complete revolutions of the button-feed-disk the star shaped design is finished and then the annular stitching $b^2$ $c^2$ has to be commenced. For this purpose the arm 9 remains in the slot of the arm 11 opposite the fulcrum of the latter so that the needle continues to move up and down within the ring $a$. The lever 54 is so turned by the cam-groove 65 that by means of the rod 67 the pawl 69 is brought out of engagement with the toothed ring 53 and the pawls 35, 48 remain out of engagement with the covering-feed-ratchet 27 and the clamp-wheel 28. The button-feed-disk is turned step by step, the step being suitably reduced as compared with the step when the star shaped design is being made and this is again done by the toothed-rings 52, 53, in the following manner:—The lever 54 operates by means of an intermediate lever 78, Figs. 8 and 5ᶜ a rod 79 pivotally connected to such lever 78 (Fig. 5) to the free end of which rod a pawl 80 is pivoted which is adapted to engage into the toothed ring 53, (see also Fig. 6). In this way the toothed ring is rotated step by step. A projection 81 is provided on the rod 79 which while the covering and the star-shaped design are made bears against a part of a cam 82 on the controlling shaft 154 having a large radius so that the pawl 80 is out of engagement with the ring 53. After completing the star-shaped design the incline 83 of the cam 82 moves past the projection 81 and the spring 84 connecting the lever 54 and the rod 79 draws the latter with the pawl 80 inward whereby the pawl 80 is brought into engagement with the toothed ring 53. After the button has been turned in this way through a whole revolution and the annular stitching $b^2$ $c^2$ has been completed the button is finished in most cases and the machine has to be stopped automatically. Further it is desirable that the machine should run at a higher speed while the covering and the annular stitching $b^2$ $c^2$ are being formed than while the star-shaped design is being made. For this purpose on the shaft 5, Fig. 15, three loose pulleys 85, 86, 87 and a fast pulley 88 are mounted and further two belts or cords 89, 90 are provided one of which 89 permanently runs with a high speed and the other 90 permanently runs at a lower speed. The two belts or cords are held by a fork 91 connected to a lever 93 pivoted at 92 in the frame of the machine. The lever is on the one hand under the action of a cam 94 on a controlling shaft 154 and on the other hand under the action of a spring 95. The cam 94 has two steps 96, 97 different in height and is so revolved that while the covering is being made the lever 93 bears against the step 97 whereby the fast running belt 89 is held on the fast pulley 88 and the slow belt 90 is on the loose pulley 86. The machine then runs at a high speed. After completing the covering the lever 93 comes upon the cam step 96 whereby the slow belt 90 is thrown on the fast pulley 88 and the fast belt comes on the loose pulley 85, the machine then runs at a reduced speed while the star design is being made. After completing the latter the lever 93 comes again on the cam step 97 and the machine runs at a high speed while the angular stitching $b^2$ $c^2$ is being formed and when this is finished the lever 93 comes upon the highest step of the cam 94 and the two belts 89, 90 come upon the loose pulleys 86, 87 whereby the machine is stopped: this position is shown in Fig. 15.

The shuttle is arranged in the well-known manner in a shuttle-race 59, Fig. 8, and is operated as usual by a crank 98 upon the shaft 73 through the medium of a rod 99 acting upon a crank 100 on the shaft 101 (see also Fig. 6). Another arm 102 of the latter actuates the arm 103 of the shuttle-driving shaft 104.

The thread tension devices are of the greatest importance for the proper working of the machine and more particularly those which act on the needle-thread as the latter has, when the covering is being made, to be drawn to the inside of the ring in order to insure a proper concatination of the threads. While the star-shaped design and the annular stitching $b^2$ $c^2$ are being made the thread has to be drawn out readily. For this purpose the needle thread $b$ passes from the usual needle thread bobbin not shown and through the usual automatic thread brake 57 first over a small roller 105 to the thread-brake 106, then around a thread-hook 107 to the take-up arm 108 and thence through a thread clamp 109 on the front plate of the needle casing, see Fig. 14, to the needle 1. The thread-brake 106, Figs. 6 and 16, consists as usual of two disks 110, 111 between which the needle-thread passes. These disks are mounted on a secrew-spindle 112 slotted longitudinally, the disk 111 carries a yoke 113 through which the spindle passes freely and between this yoke and a nut 114 screwed upon the spindle a light brake spring 115 is interposed. On the spindle there is further mounted a washer 116 having a bridge-piece 120 passing through the slot 119 of the spindle. Between this washer and a nut 117 screwed upon the spindle within the yoke 113 a strong brake spring 118 is interposed. While the covering is being formed the strong brake-spring 118 has to be in operation whereas when the star-design and the annular stitching $b^2$ $c^2$ are being made only the light spring 115 has to operate. For this purpose a pin 121 Figs. 16 and 6 on a rod 122 extends through a central bore in the spindle into the slot 119 of the spindle 112. The rod 122 carries an arm 123 (see also Fig. 5$^b$) and another arm 124. While the covering is being formed the arm or dog 123 is kept raised by a cam 125 on a controlling shaft 154 (Fig. 12) and the pin 121 is out of engagement with the washer 116 and the disks 110, 111 are forced the one against the other by the strong spring 118. After completing the covering an incline 126 of the cam 125 comes under the arm or dog 123 which then turns together with the rod 122 so that the arm 124 on the said rod runs up an incline 127 on the frame of the machine whereby the rod 122 is pushed forward so that the washer 116 is forced away from the disk 111 of the thread-brake. This latter is then only under the action of the light spring 115. The take-up arm 108 is actuated in the well known manner by a cam 128, Fig. 6, acting upon a stud 129 of the take-up arm pivoted at 130 in the frame of the machine. From this take-up arm the needle-thread $b$ goes to the needle thread clamp. This consists of a heavy plate spring 109 Fig. 14 adapted to press the thread against the front-plate 131 of the needle-casing. The thread-clamp has to lock the needle-thread when the needle in its radial movement passes across the ring $a$. As it clamps or locks the needle-thread in the inward movement of the needle, the shuttle-thread loop $h$ (Fig. 1) formed on the outside of the ring $a$ is drawn by the tightly stretched needle-thread when the needle moves inward, over the top-side of the ring as already set forth and is then pushed downward by the needle sliding along the needle-thread. After this has been done the needle thread clamp is opened and a further length of needle-thread can be drawn out for forming the needle-thread loop at the inside of the ring. For enabling the needle-thread-clamp to operate in this way a pin 132 passes through a hole in the front plate 131 of the needle-casing, this pin is attached to a bar 133, Fig. 9, guided in the frame and by means of a sleeve 134 also along the rod 122 of the needle-thread-brake. The rod 133 is provided with an arm 135 acted upon by a cam 136 on the shaft 42; by the combined action of the clamping spring 109 and the spring 138 strung upon the rod 133, the arm 135 is held against the cam 136 which is so shaped that the rod 133 is held in its forward position while the covering is being made and by means of the pin 132 keeps the clamp spring 109 off the plate 131 so that the needle-thread $b$ can pass freely with the exception of the periods when the needle moves radially to the ring $a$ and immediately afterward. In the last named periods the cam 136 permits the arm 135 to move back and the rod 133 is pushed back by the springs so that the pin 132 releases the spring 109 and the latter firmly clamps the needle-thread. After finishing the covering the rod 122 of the needle thread brake is pushed forward as already described for reducing the thread-tension during the time that the star-design and the annular stitching $b^2$ $c^2$ are made. A collar 137 on the rod 122 then forces the sleeve 134 and therefore also the rod 133 in a forward direction so that the spring 109 is raised off the plate 131 and cannot act any more upon the thread. A further requirement of a correct formation of the stitches while the covering is being made is that a length of shuttle-thread is drawn from the shuttle while the needle goes from the inside of the ring $a$ to its outer side in order to keep ready a sufficient length of shuttle thread for forming the shuttle-thread-loop on the outside of the ring. For this purpose a hook 139 is provided for engaging the shuttle-thread to form the necessary shuttle-thread loop; the needle-thread being kept tightly stretched during the movement of said hook 139 to furnish the necessary support for the shuttle-thread. This is secured by the thread-clamp 109 in the manner hereinbefore described. The hook 139 is moved at the proper time in the following manner: The hook is pivoted at 140 in the frame of the machine and is connected by rod 141 with a slotted lever 142 fulcrumed at 143 in the frame of the machine. The end 144 of the rod 141 engaging into a slot of the said lever is connected by a rod 145 with a lever 146 acted upon by a cam 147 on a shaft 148 driven by the shaft 73 with half the angular speed of the latter. The slotted lever 142 is further connected with a lever 149 acted upon by a cam 150 on the shaft 73. The cams 147 and 150 are so shaped that when the end 144 of the rod 141 is brought to the outer end of the slot in the lever 142, the latter is turned back by the cam 150 so that the hook 139 draws a length of thread from the shuttle. When this is done the end 144 of the rod 141 moves to the inner end of the slot in the lever 142 opposite the fulcrum of the latter and remains there during the remainder of the revolution of the cam 147. In the revolution made by the cam 150 in the meanwhile and the oscillation of the slotted lever 142 the rod 141 remains at rest because its end 144 is then opposite the fulcrum of the lever 142 so that when a stitch is formed on the inside of the ring no thread is drawn from the shuttle. For throwing out of operation this mechanism after finishing the covering, the fulcrum 151 of the lever 149 is carried by one end of the lever 152 (Fig. 8) pivoted on the fulcrum 143 of the lever 142 and the lever 152 is acted upon by a cam 153 on the controlling shaft 154 in such a manner that the lever 152 is turned after finishing the covering so far that it carries the lever 149 out of engagement with the cam 150 and is held in this position while the star-shaped design and the annular stitching $b^2$ $c^2$ are being made. The slotted lever then ceases to rock and the hook 139 is inoperative although the cam 147, the lever 146 and the rod 145 continue to move.

As is seen from above the entire operation of the machine is controlled by the cams 45, 65, 77, 82, 94, 125, and 153. These cams are mounted on a common controlling shaft 154 journaled in the frame of the machine, (Figs. 12, 13, 5, 6 and 7). A ring 155 is free to turn around this shaft and is provided with a handle 156 carrying a pawl 157 engaging into a ratchet wheel 158 free to turn around the shaft 154. The ratchet-wheel 158 is firmly attached to a brake wheel 160 likewise free to turn around the shaft 154 and carrying a spring-brake 161 provided with an arm 162 engaging into a slot 163 (Fig. 7) in a post 164 fast in the frame. Above the ring 155 a ring 165 is provided free to turn around the shaft 154 and carrying a pawl 159 adapted to engage into the ratchet wheel 158. The wheel 165 carries an arm 166 acted upon by a cam 167 upon the shaft 42, the parts being so arranged that the ring 155 is advanced by a tooth for each revolution of the shaft 42 i. e. for any two consecutive stitches. The spring-brake 161 and the arm 162 carried thereby prevent any excessive movement of the ring 158 due to inertia. Above the ring 160 there is provided a disk 168 fastened to the shaft 154 and above this disk a ring 169 is arranged which is free to revolve around the shaft 154 and carries on the one hand a pawl 170 adapted to engage into a ring 177 fast on the shaft 154 and on the other hand is connected to the eccentric rod 171 of an eccentric 172 mounted upon the shaft 73. The rings 155, 165, 158, 160 and 169 which as above stated are free to rotate around the shaft 154 are preferably carried by a drum 173 fast on the said shaft 154 and provided with a projecting pin 175 (Fig. 13) engaging into a sector-shaped recess 174 in the ring 158. The ring 158 is moved step by step in the direction of the arrow 176 as above described and hence turns the drum 173 as long as the pin 175 bears against the rear end of the recess 174. After a predetermined number of steps of the ring 158, the drum 173, and the ring 177, a recess 178 in the ring 177 comes under the pawl 170 continuously reciprocated by the eccentric 172 and the eccentric rod 171 and such pawl then engaging into such recess 178 causes the ring 177 together with the drum 173 and the shaft 154 to turn likewise in the direction of the arrow through such a distance that the pin 175 nearly reaches the front end of the sector-shaped recess 174 and indicated by dotted lines in Fig. 13. The following to and fro movements of the pawl 159 then simply turn the ring 158 around the drum 173 without affecting the latter until the rear end of the sector-shaped recess 174 strikes once more against the pin 175. During this time the drum 173 and the shaft 154 are no more actuated by the pawl 170, because the latter then freely slides to and fro on a smooth part 179 of the ring 170 succeeding the recess 178. But if by so moving the ring 158 the rear end of the sector-shaped recess 174 has reached the pin 175 then the drum 173 will again turn together with the ring 158 as the latter is advanced step by step by the pawl 159 until the next recess 178 of the ring 177 comes into engagement with the pawl 170 whereupon the operation above described is repeated. The movement of the shaft 154 and the cams 45, 65, 77, etc., fastened to it is therefore such that at first it makes a number of short steps owing to the coöperation of the ring 158 and the pin 174 and the rear end of the sector-shaped recess 175, that then it makes a long step owing to the coöperation of the pawl 170 and the recess 178 of the ring 177 and then remains stationary until by advancing the ring 158 the rear end of the sector-shaped recess has reached the pin 174. It is at the time that the drum 173 and the shaft 154 make the said long step that the cams 45, 65, 77, etc., cause the parts actuated by them to be moved and therefore their movement is a rapid one which is the principal advantage of the arrangement described.

Instead of mounting the cams 45, 65, 77, etc., upon single common shaft 154 as above described they obviously can be mounted on a plurality of shafts actuated by a permanently revolving shaft of the machine.

The machine is provided with a presser-foot 180 secured to the presser-foot-bar 14 such presser-foot being of any known or preferred construction and being guided in the usual manner and actuated by the shaft 42. The presser-foot-bar is oscillated around its longitudinal axis by an arm 181 (Figs. 5, 6 and 9) secured to it, one end of such arm engaging with a lever 183 journaled on a stud 182. The said lever is actuated by a cam 184 on the shaft 42. The vertical to and fro movement is imparted to the presser-foot in the following manner:—The stud 182 is adapted to turn on a journal pin 185 at right angles to the stud, the journal-pin carrying an arm 186 acted upon a cam 187 on the shaft 42. The preser-foot has not, however, to feed the ring while the button is being made but it has only to spread the shuttle-thread-loops of the covering on the top of the ring $a$ and to smooth them, while such covering is being made. Therefore the presser-foot has to act only at each second stitch, that is to say, when the shuttle-thread-loop has been drawn over the top-side of the ring and it is for this reason that the presser-foot-bar is actuated by the shaft 42; and moreover the presser-foot must be thrown out of operation after finishing the covering. This latter is brought about by an arm 188 on the rod 122 (Figs. 6 and 9) of the needle-thread-brake 106 which arm after the covering has been finished is turned by the rod 122 (which is then turned itself as hereinbefore described) and acting upon an arm 189 fixed to the presser-foot-bar 14 raises the latter whereby also the arm 186 comes out of engagement with the cam 187. Another arm 190 fast on the dog 123 coöperates with an arm 191 fast on the lever 181 so that when the rod 122 is turned the lever 181 is thrown out of engagement with the cam 184.

In order to insure that the threads twisted around each other before the formation of the covering as shown at $d$, Fig. 1, may be covered by such covering without in any way interfering with the regular stitching when finishing the covering, there is provided a protecting foot 192, Figs. 7 and 9 carried by an arm 193 of a short spring actuated shaft 194 journaled in the framing of the machine. This arm 193 is connected by a link 195 with the arm 75 acted upon by the cam 77 as above described and moving the arm 9 along the slot in the lever 11. In this way the result is obtained that the protecting foot 192 is in close juxtaposition to the ring $a$ only while the covering is being made and that when the formation of the covering approaches the end such protecting foot forces the twisted thread ends (as at $d$) against the inside of the ring so that they are safely inclosed by the shuttle-thread-loops forming the covering without in any way interfering with the stitching.

For making a button the ring $a$ is simply placed between the wheels 16 and 17 and the pressing wheel 18, the ends of the threads are placed under a clamping-spring 51 on the clamp-wheel 28 and the machine is started. The mechanism hereinbefore described for actuating the toothed ring 53 and the ratchet wheel 27, 28 are out of operation while the first stitches are being made and also the mechanism for moving the needle radially to the ring. The ring 158 however, is advanced step by step together with the shaft 154 as above set forth. By the first stitches, therefore, the threads are merely twisted around each other at the inside of the ring $a$ as shown at $d$ on the right-hand side of Fig. 1. After a predetermined number of such stitches the shaft 154 will have been turned so far that the cams 45, 77, etc., come into operation for throwing into action the covering feed ratchet 27 and the clamp wheel 28 and for causing the radial movements of the needle to be set up and moreover for causing the needle-thread-brake and the needle-thread-clamp to be operated in the manner required for forming the covering as hereinbefore described. The following operation up to the finishing of the button are then brought about automatically in proper succession until the button is completed, when the machine is stopped and the parts have returned into their initial positions all as hereinbefore described. The finished button may then be removed. In order to prevent an untimely removal of the button, the clamp-wheel 28 is provided with a recess 197 which on placing the ring between the wheels 16 and 17 and the pressing wheel 18 is opposite the projection 34 on the disk 33 above the said pressing wheel. At the same time the journal-pin 198 of the pressing-wheel is in engagement with a hook 199 (Figs. 10 and 11) below the cloth-plate 24 such hook being provided with a handle 200 extending through a slot 201 in the cloth-plate and projecting beyond the same (see also Fig. 5). The presser-wheel can thus be drawn back by the handle 200, the projection 34 entering the recess 197 for permitting the ring $a$ to be placed in position. The spring 21 and disk 33 are shown formed of a single resilient plate, which is rigidly secured at $21^a$ to the button-feed disk 20. While the button is being made the clamp-wheel 28 always rotates with the button as above described, but the pressing-wheel 18 journaled in the button-feed-disk always moves with the latter as above described. The button-feed-disk 20 being stationary as above described while the covering is being made while the clamp-wheel 28 turns with the ring $a$ the projection 34 is stationary when the covering is formed and the journal pin 198 remains in engagement with the hook 199 but the recess 197 is moved step by step. Therefore, the pressing wheel 18 cannot be drawn back while the covering is being formed as the projection 34 would be arrested by the inner edge of the clamp-wheel 28. After finishing the covering the button-feed-disk 20 is rotated by the toothed-ring 52 and the pinion 23. The projection 34 and the clamp-wheel 28 then rotate together with the button-feed-disk and the relative position of the projection 34 and the recess 197 does not change at this stage. The journal pin 198 of the pressing wheel 18, however, comes out of engagement with the hook 199 so that the pressing-wheel cannot be drawn back while the star-shaped design and the annular-stitching $b^2 c^2$ are being formed and the button cannot be removed. If after automatically stopping the machine the projection 34 were not opposite the recess 197, the clamp wheel may be turned by hand for bringing them opposite each other. If at this time the journal-pin 198 of the pressing-wheel 18 were not in engagement with the hook 199 the ring 53 concentric and fast with the toothed ring 52 may be turned by hand for bringing the said journal-pin into the desired position. For this purpose a segment 202 concentric to the toothed-ring 53 is provided which is free to revolve in the cloth-plate and carries a spring pawl 203 adapted to engage into the toothed ring 53 and is moreover provided with a handle 204, Figs. 5, $5^c$ and 7.

In order that while the covering is being formed the button-feed-disk 20 may be positively held stationary and prevented from turning with the button rotated by the covering feed ratchet there is provided at the bottom-side of the pinion 23 a recess 205 into which engages an arm 206 on a rod 207 which is acted upon by a cam 208 upon the controlling shaft 154. When the covering is commenced the rod 207 is so turned that the arm 206 engages into the recess 205 and thus locks in position the pinion 23 and the button feed disk 20 thereby preventing them from turning in one direction. When the covering is finished the arm 206 is turned out of the recess 205 by the cam 208.

For securing an accurate and regular movement of the toothed rings 52, 53 it is desirable to provide them with spur-wheel-teeth and to so shape the pawls 69, 80 that they snugly fit between the teeth of the ring 53 in order to prevent the same from moving beyond its acurate position owing to its momentum. In such case the pawls must be forced between the teeth while they are making their working stroke and must come out of engagement with the said teeth before commencing their return-stroke. For this purpose in the case of the pawl 69 the cam 58 on the shaft 42 is provided which rocks the lever 54 so that the pawl 69 connected with the said lever by the rod 67 is alternately pushed between the teeth of the toothed ring 53 and moved out between the same. Of course the cam-groove 65 must be so shaped as to allow for the required outward movement of the pawl. In the case of the pawl 80 its inward and outward movement is obtained by pivotally connecting the rod 79 with the intermediate lever 78 and causing its rear extension 196 to be acted upon by a cam 209 on the shaft 42.

The handle 156 serves for adjusting the ring 158 and the shaft 154 together with its cams 45, 65, 77, etc., if this is at any time required.

The hereinbefore described machine operating automatically throughout serves for making buttons such as shown in Fig. 2. If it is desired to stitch in such buttons one or more internal annular stitchings $b^3 c^3$, as shown in Fig. 3, it is only necessary after finishing the annular stitching $b^2 c^2$ to suitably adjust the cloth-plate 24 together with the button-feed-disks 20 the covering feed-ratchet 27, the clamp-wheel 28 and the toothed rings 52, 53 relatively to the needle. It is for this purpose that the cloth-plate 24 forms a bearing for the toothed rings 52 and 53. The cloth-plate is adapted to slide in guides 210 of the frame of the machine and may be adjusted therein by hand by means of a handle 211 or it may be adjusted automatically by means of a cam 222, Fig. 18, on the controlling shaft 154 through the medium of a suitable link and lever-gear 223, 212, 213 in a manner similar to such as has been hereinbefore described in connection with the belt-fork 91. The ring $a$ is advanced, the same as in forming the stitching $b^2 c^2$, by the pawl 80 and the toothed-ring 53. The slight displacement of the toothed rings 53 relatively to the pawl 80 on adjusting the cloth-plate 54 as set forth affects only the first stitch because the toothed ring 53 is brought into the correct position relatively to the pawl 80 by the latter itself on its first working stroke. If the working plate is adjusted in this way once only but the ring is allowed to make a number of revolutions then a corresponding number of internal annular stitchings $b^3$ $c^3$, the one close to the other is obtained, to wit, if such an annular stitching has been finished and the ring continues to rotate, then the point of the needle does not stitch for well known reasons into such annular stitching even if the cloth-plate 24 is not adjusted, but it goes down slightly outside such annular stitching so that the needle-shank when moving downward forces inward the annular stitching already formed. Therefore when an outer annular stitching $b^3$ $c^3$ is formed, all the annular stitchings previously made inside the same are slightly forced inward without adjusting the cloth-plate.

If it is desired to make a button as shown in Fig. 4 it is necessary after forming the star-shaped design shown in Fig. 2 but before making the annular stitching $b^2$ $c^2$ to repeat the same operation as in forming the star-design Fig. 2 but the step of the ring has to be varied to correspond. For the latter purpose it is sufficient to correspondingly change the stroke of the pawl 69. The simplest way of doing this consists in connecting the rod 70 actuating this pawl with the lever 71 by a stud 212 Fig. 17, on the said rod engaging into a slot 213 in the lever 71, and adjustable in such slot. If a button as shown in Fig. 4 has to be made, after finishing the star design shown in Fig. 2 the stud 212 is moved inward in the slot 213 to a suitable extent and the button is caused to make a number of steps given in total a number of complete revolutions. If for instance the step of the button in forming the star-design Fig. 2 was 15/32 of a revolution, then the stud 212 has to be adjusted inwardly in the slot 213 to such an extent that the stroke of the pawl 69 is reduced in the ratio of 15:11. The step of the ring will then be 11/32 of a revolution and if the ring is then permitted to make again 32 steps (11 revolutions) the design shown in Fig. 4 is obtained. By adjusting the stud 212 in the slot 213 it is possible to vary the step of the ring at will for instance it may be changed from 15/32 of a revolution to 23/48 of a revolution then by 23 revolutions of the ring a star having 48 points will be obtained. The stud 212 may be adjusted in the slot 213 either by hand or by a cam 222 (Fig. 18) on the controlling shaft 154 through a suitable link- and lever-gearing 223, similar to that shown and described in connection with the belt-fork 91. The stroke of the pawl 69 may also be varied by replacing the cam 72 on the shaft 73 by another one. Moreover as shown in Fig. 19, a plurality of such cams for different strokes of the pawl 69 and steps of the ring $a$ may be rigidly connected with each other and the entire set of cams may be so keyed on the shaft 73 that it may be moved along the same in order to bring the one or the other of such cams into engagement with the lever 71. These movements of the set of cams along the shaft may also be brought about by hand or automatically by a cam 224 on the controlling shaft 154. Also buttons of different sizes may be made on one and the same machine. For this purpose it is only necessary to replace the wheels 16 and 17 by others so that the geometrical axis of the ring $a$ always coincides with that of the pinion 23 and the internally toothed wheel 25. For this purpose the wheels 16 and 17 must be journaled in radial slots 214, Fig. 10, of the button-feed-disk 20. Further the slot 22 receiving the journal-pin 198 of the pressing wheel 18 and also the spring of the latter will have to be made longer in order that the pressing wheel may be adjusted through a greater distance so that even the smallest ring $a$ will be firmly pressed against the wheels 16, 17. Finally the cloth-plate 24 has to be adjusted by means of a handle 211 so that the periphery of the ring is in proper position relatively to the needle that is to say so that the needle may move alternately inside and outside the ring while the covering is being formed, whereas at the other stages of making the button it has to reciprocate only inside the ring.

The number of steps of the ring while the covering is being formed, is, provided that the thickness of the thread is the same, proportional to the diameter of the ring and will diminish as this diameter decreases. The length of each individual step of the ring during the formation of the covering must then remain the same. This latter condition is fulfilled by driving the ring during the formation of the covering by the wheels 16 and 17, the internally toothed wheel 25 and the covering feed ratchet 27. In this part of the mechanism no change whatever is required when the size of the button has to be varied. An accurate engagement of the pawls 35, 48 with the ratchet 27, 28 may be readily obtained, if necessary, by slightly adjusting the pawl as is well known in the art.

The movement of the button in forming the star design and the annular stitching $b^2$, $c^2$ is exactly the same (provided the design is the same) whether the button is large or small. If the engagement of the pawls 69 and 80 with the toothed ring 53 should cease to be accurate on account of the latter having been adjusted together with the cloth-plate as above set forth, this may be readily remedied by slightly adjusting the said pawls as is well known in the art.

A change of the stroke of the needle in its radial movement or vibration when broad or thin rings a are used may be obtained, if required, by using a pin and slot connection between the rod 9 and the frame 3, the stud 216 on the frame engaging into a slot 217 in the lever 215 as shown in Figs. 7 and 9, the frame 3 being adjustable vertically in the needle casing. Such an adjustment will in most cases not be required because the same effect may be obtained with a constant stroke of vibration of the needle sufficient for the broadest rings by adjusting the needle-thread-brake, as is well understood in the art.

The control of the machine by the cam on the controlling-shaft 154 will have to be changed whenever the design of the button is varied because different designs require different numbers of stitches and therefore rotations of the ring 158 through different angles before the several cams hereinbefore described have to come into operation. As in the case of small buttons the number of stitches required for forming the covering is smaller than in the case of large buttons, for buttons of different sizes the cams on the controlling shaft 154, which come into operation in passing from the formation of the covering to that of the star design, will have to be changed.

What I claim is:—

1. In a lock stitch sewing machine for making thread buttons, the combination of a shuttle, a needle bar and a needle with means for holding a rigid ring between the needle bar and the shuttle, means for intermittently rotating such rigid ring around its geometrical axis substantially parallel to the needle bar whereby the said ring is caused to make a plurality of consecutive complete revolutions, means for varying the angle through which the ring moves at each step, means for reciprocating the needle longitudinally, means for vibrating the needle radially to the ring whereby the needle is caused to descend alternately inside and outside the ring, means for rendering the vibrating means operative at a predetermined moment, means for rendering the vibrating means inoperative at a predetermined moment whereby the needle is caused to reciprocate longitudinally inside the ring only, means for controlling the needle thread tension, and means for clamping the needle thread at a predetermined moment, whereby the shuttle thread loops formed on the descent of the needle outside the ring are drawn over the top side of such ring to its inside.

2. In a lock stitch sewing machine for making thread buttons, the combination of a shuttle, a needle bar and a needle with means for holding a rigid ring between the needle bar and the shuttle with its geometrical axis substantially parallel to the needle bar, means for intermittently rotating such ring around its geometrical axis whereby such ring is caused to make substantially one complete revolution moving through a predetermined angle at each step, means for intermittently rotating such ring around its geometrical axis whereby the said ring is caused to make a plurality of further complete revolutions, means for reciprocating the needle longitudinally, means for vibrating the needle radially to the ring whereby the needle is caused to descend alternately inside and outside the ring, means for rendering the vibrating means operative at the beginning of the first named revolution of the ring, means for rendering the vibrating means inoperative at the end of the first named revolution of the ring whereby the needle is caused to reciprocate longitudinally inside the ring only, means for controlling the needle thread tension and means for clamping the needle thread at predetermined moments, whereby the shuttle thread loops formed on the descent of the needle outside the ring are drawn over the top side of such ring to its inside.

3. In a lock stitch sewing machine for making thread buttons, the combination of a cloth plate, a shuttle, a needle bar, and a needle with a button feed disk journaled in the said cloth plate, a ring disk fast in the cloth plate, containing the needle hole and located within such button feed disk, the button feed disk and the ring disk being located between the needle bar and the shuttle, means for holding a rigid ring on the ring disk within the button feed disk with its geometrical axis substantially parallel to the needle bar, means for intermittently rotating such ring around its geometrical axis whereby such ring is caused to make substantially one complete revolution moving through a predetermined angle at each step, means for intermittently rotating the button feed disk whereby it is caused to make together with the ring a plurality of further complete revolutions; means for reciprocating the needle longitudinally, means for vibrating the needle radially to the ring whereby the needle is caused to descend alternately inside and outside the ring, means for rendering the vibrating means operative at the beginning of the first named revolution of the ring, means for rendering the vibrating means inoperative at the end of the first named revolution of the ring whereby the needle is caused to reciprocate longitudinally inside the ring only, means for controlling the needle thread tension, means for clamping the needle thread at predetermined moments whereby the shuttle thread loops formed on the descent of the needle outside the ring are drawn over the top side of such ring to its inside.

4. In a lock stitch sewing machine for making thread buttons, the combination of a cloth plate, a shuttle, a needle bar and a needle with a button feed disk journaled in the said cloth plate, a ring disk fast in the said cloth plate containing the needle hole, and located within such button feed disk, the button feed disk and the ring disk being located between the needle bar and the shuttle, toothed wheels and a pressing wheel journaled in the button feed disk such wheels being adapted to hold between them a rigid ring with its geometrical axis substantially parallel to the needle bar and centrally on the button feed disk, a spring acting on such pressing wheel and adapted to force it against the said ring, means for intermittently rotating such ring round its geometrical axis whereby such ring is caused to make substantially one complete revolution moving through a predetermined angle at each step, means for intermittently rotating the button feed disk whereby it is caused to make together with the ring a plurality of further complete revolutions, means for reciprocating the needle longitudinally, means for vibrating the needle radially to the ring whereby the needle is caused to descend alternately inside and outside the ring, means for rendering the vibrating means operative at the beginning of the first named revolution of the ring, means for rendering the vibrating means inoperative at the end of the first named revolution of the ring whereby the needle is caused to reciprocate longitudinally inside the ring only, means for controlling the needle thread tension and means for clamping the needle thread at predetermined moments whereby the shuttle thread loops formed on the descent of the needle outside the ring are drawn over the top side of such ring to its inside.

5. In a lock stitch sewing machine for making thread buttons, the combination of a cloth plate, a shuttle, a needle bar and a needle with a button feed disk journaled in the said cloth plate, a ring disk fast in the said cloth plate, containing the needle hole and located within such button feed disk, the button feed disk and the ring disk being located between the needle bar and the shuttle, toothed wheels and a pressing wheel journaled in the button feed disk, such wheels being adapted to hold between them a rigid ring with its geometrical axis, substantially parallel to the needle bar and centrally on the button feed disk, disks loosely mounted on the said toothed wheels and the pressing wheel, such disks being adapted to partly overlap the said ring, means for intermittently rotating such ring around its geometrical axis whereby such ring is caused to make substantially one complete revolution moving through a predetermined angle at each step, means for intermittently rotating the button feed disk, whereby it is caused to make together with the ring a plurality of further complete revolutions, means for reciprocating the needle longitudinally means for vibrating the needle radially to the ring whereby the needle is caused to descend alternately inside and outside the ring, means for rendering the vibrating means operative at the beginning of the first named revolution of the ring, means for rendering the vibrating means inoperative at the end of the first named revolution of the ring whereby the needle is caused to reciprocate longitudinally inside the ring only, means for controlling the needle thread tension, and means for clamping the needle thread at predetermined moments whereby the shuttle thread loops formed on the descent of the needle outside the ring are drawn over the top side of such ring to its inside.

6. In a lock stitch sewing machine for making thread buttons, the combination of a cloth plate, a shuttle, a needle bar and a needle with a button feed disk journaled in the said cloth plate, a ring disk fast in the said cloth plate, containing the needle hole and located within such button feed disk, the button feed disk and the ring disk being located between the needle bar and the shuttle, toothed wheels and a pressing wheel journaled in the button feed disk, such wheels being adapted to hold between them a rigid ring with its geometrical axis substantially parallel to the needle bar and centrally on the button feed disk, an internally toothed wheel journaled in the cloth plate, inclosing the button feed disk and engaging into the said toothed wheels, a covering feed ratchet fast with the said internally toothed wheel, means for intermittently rotating such covering feed ratchet holding stationary the button feed disk whereby the said ring is caused to make substantially one complete revolution moving through a predetermined angle at each step, means for intermittently rotating the button feed disk whereby it is caused to make together with the ring a plurality of further complete revolutions, means for reciprocating the needle longitudinally, means for vibrating the needle radially to the ring whereby the needle is caused to descend alternately inside and outside the ring, means for rendering the vibrating means operative at the beginning of the first named revolution of the ring, means for rendering the vibrating means inoperative at the end of the first named revolution of the ring whereby the needle is caused to reciprocate longitudinally inside the ring only, means for controlling the needle thread tension and means for clamping the needle thread at predetermined moments whereby the shuttle thread loops formed on the descent of the needle outside the ring are drawn over the top side of such ring to its inside.

7. In a lock stitch sewing machine for making thread buttons, the combination of a cloth plate, a shuttle, a needle bar and a needle with a button feed disk journaled in the said cloth plate, a ring disk fast in the cloth plate, containing the needle hole, and located within such button feed disk, the button feed disk and the ring disk being located between the needle bar and the shuttle, toothed wheels and a pressing wheel journaled in the button feed disk, such wheels being adapted to hold between them a rigid ring with its geometrical axis substantially parallel to the needle bar and centrally on the button feed disk, an internally toothed wheel journaled in the cloth plate inclosing the button feed disk and engaging into the said toothed wheels, a covering feed ratchet fast with the said internally toothed wheel, means for intermittently rotating such covering feed ratchet and holding stationary the button feed disk whereby the said ring is caused to make substantially one complete revolution moving through a predetermined angle at each step, means for intermittently rotating the button feed disk whereby it is caused to make together with the ring a plurality of further revolutions, a clamp wheel concentric with and loosely mounted on the said covering feed ratchet, means for clamping loose thread ends to such clamp wheel, means for rotating such clamp wheel at all times together with the ring, such means comprising a pawl adapted to coöperate with the said means for intermittently rotating the covering feed ratchet, means for reciprocating the needle longitudinally, means for vibrating the needle radially to the ring whereby the needle is caused to descend alternately inside and outside the ring, means for rendering the vibrating means operative at the beginning of the first named revolution of the ring, means for rendering the vibrating means inoperative at the end of the first named revolution of the ring whereby the needle is caused to reciprocate longitudinally inside the ring only, means for controlling the needle thread tension, and means for clamping the needle thread at predetermined moments whereby the shuttle thread loops formed on the descent of the needle outside the ring are drawn over the top side of such ring to its inside.

8. In a lock stitch sewing machine for making thread buttons, the combination of a cloth plate, a shuttle, a needle bar and a needle with a button feed disk journaled in the said cloth plate, a ring disk fast in the cloth plate, containing the needle hole and located within such button feed disk, the button feed disk and the ring disk being located between the needle bar and the shuttle, toothed wheels and a pressing wheel journaled on the button feed disk, such wheels being adapted to hold between them a rigid ring with its geometrical axis substantially parallel to the needle bar and centrally on the button feed disk, an internally toothed wheel journaled in the cloth plate, inclosing the button feed disk and engaging into the said toothed wheels, a covering feed ratchet fast with the said internally toothed wheel, means for intermittently rotating such covering feed ratchet and holding stationary the button feed disk whereby the said ring is caused to make substantially one complete revolution moving through a predetermined angle at each step, means for intermittently rotating the button feed disk whereby it is caused to make together with the ring a plurality of further revolutions, a clamp wheel concentric with and loosely mounted on the said covering feed ratchet, means for clamping loose thread ends to the clamp wheel, means for rotating such clamp wheel at all times with the ring, such means comprising a pawl adapted to coöperate with the means for intermittently rotating the covering feed ratchet, a clutch device interposed between the button feed disk and the internally toothed wheel whereby the button feed disk, the covering feed ratchet and the clamp may be rotated independently the one of the others, means for reciprocating the needle longitudinally, means for vibrating the needle radially to the ring whereby the needle is caused to descend alternately inside and outside the ring, means for rendering the vibrating means operative at the beginning of the first named revolution of the ring, means for rendering the vibrating means inoperative at the end of the first named revolution of the ring, whereby the needle is caused to reciprocate longitudinally inside the ring only, means for controlling the needle thread tension, and means for clamping the needle thread at predetermined moments whereby the shuttle thread loops formed on the descent of the needle outside the ring are drawn over the top side of such ring to its inside.

9. In a lock switch sewing machine for making thread buttons, the combination of a cloth plate, a shuttle, a needle bar and a needle with a button feed disk journaled in the said cloth plate, a ring disk fast in the said cloth plate containing the needle hole and located within such button feed disk, the button feed disk and the ring disk being located between the needle bar and the shuttle, means mounted on the button feed disk for holding a rigid ring with its geometrical axis substantially parallel to the needle bar and centrally on the button feed disk, means for intermittently rotating such ring around its geometrical axis whereby such ring is caused to make substantially one complete revolution moving through a predetermined angle at each step, a pawl adapted to hold stationary the button feed disk, means comprising a cam on a controlling shaft for throwing such pawl into and out of engagement at the beginning and at the end respectively of such complete revolution, means for intermittently rotating the button feed disk whereby it is caused to make together with the ring a plurality of further complete revolutions, means for reciprocating the needle longitudinally, means for vibrating the needle radially to the ring whereby the needle is caused to descend alternately inside and outside the ring, means for rendering the vibrating means operative at the beginning of the first named revolution, means for rendering the vibrating means inoperative at the end of the first named revolution of the ring, whereby the needle is caused to reciprocate longitudinally inside the ring only, means for controlling the needle thread tension, and means for clamping the needle thread at predetermined moments whereby the shuttle thread loops formed on the descent of the needle outside the ring are drawn over the top side of such ring to its inside.

10. In a lock stitch sewing machine for making thread buttons, the combination of a cloth plate, a shuttle, a needle bar and a needle with a button feed disk journaled in the cloth plate, a ring disk fast in the cloth plate containing a needle hole, and located within such button feed disk, the button feed disk and the ring disk being located between the needle bar and the shuttle, toothed wheels and a pressing wheel journaled on the button feed disk, such wheels being adapted to hold a rigid ring with its geometrical axis substantially parallel to the needle bar and centrally on the button feed disk, an internally toothed wheel journaled in the cloth plate, inclosing the button feed disk and engaging into the said toothed wheels, a covering feed ratchet fast with the internally toothed wheel, a clamp wheel concentric with and loosely mounted on the said covering feed ratchet, the latter and the clamp being provided with oppositely directed ratchet teeth, a pawl engaging into the covering feed ratchet, a pawl engaging into the clamp wheel, the two pawls being mounted on a common lever, means for reciprocating such lever comprising a cam on a continuously revolving shaft of the machine whereby the ring and the clamp wheel are caused to make substantially one complete revolution moving through a predetermined angle at each step, means for clamping loose thread ends to such clamp wheel, means for intermittently rotating the button feed disk whereby it is caused to make together with the ring and the clamp wheel a plurality of revolutions, means for reciprocating the needle longitudinally, means for vibrating the needle radially to the ring whereby the needle is caused to descend alternately inside and outside the ring, means for rendering the vibrating means operative at the beginning of the first named revolution of the ring, means for rendering the vibrating means inoperative at the end of the first named revolution of the ring whereby the needle is caused to reciprocate longitudinally inside the ring only, means for controlling the needle thread tension, and means for clamping the needle thread at predetermined moments, whereby the shuttle thread loops formed on the descent of the needle outside the ring are drawn over the top side of such ring to its inside.

11. In a lock stitch sewing machine for making thread buttons, the combination of a cloth plate, a shuttle, a needle bar and a needle with means for holding a rigid ring between the needle bar and the shuttle with its geometrical axis substantially parallel to the needle bar such means comprising a revoluble button feed disk journaled in the cloth plate, means for intermittently rotating such ring around its geometrical axis whereby the said ring is caused to make substantially one complete revolution moving through a predetermined angle at each step, such means comprising a covering feed ratchet, a ratch toothed clamp wheel concentric with and loosely mounted on such covering feed ratchet, gear wheels interposed between the covering feed ratchet and the ring, a pawl engaging into the covering feed ratchet, and another pawl engaging into the clamp wheel, a lever carrying the two pawls and a rod and a cam for reciprocating such lever, means comprising a controlling shaft, a cam mounted thereon and engaging with the said rod and a fixed stop for one of the said pawls, such cam being adapted to laterally shift the said rod whereby the said pawls are thrown into and out of engagement with the covering feed ratchet and the clamp wheel at the beginning and at the end of the said complete revolution, means for intermittently rotating the said button feed disk whereby it is caused to make together with the ring a plurality of further complete revolutions, means for reciprocating the needle longitudinally, means for vibrating the needle radially to the ring whereby the needle is caused to descend alternately inside and outside the ring, means for rendering the vibrating means operative at the beginning of the first named revolution of the ring, means for rendering the vibrating means inoperative at the end of the first named revolution of the ring whereby the needle is caused to reciprocate longitudinally inside the ring only, means for controlling the needle thread tension, and means for clamping the needle thread at predetermined moments whereby the shuttle thread loops formed on the descent of the needle outside the ring are drawn over the top side of such ring to its inside.

12. In a lock stitch sewing machine for making thread buttons, the combination of a shuttle, a needle bar, and a needle with means for holding a rigid ring between the needle bar and the shuttle with its geometrical axis substantially parallel to the needle bar, means for intermittently rotating such rigid ring around its geometrical axis, whereby the said ring is caused to make substantially one complete revolution moving through a predetermined angle at each step, means for intermittently rotating the said ring whereby it is caused to make a plurality of further complete revolutions, means for reciprocating the needle longitudinally, means for vibrating the needle radially to the ring whereby the needle is caused to descend alternately inside and outside the ring, such means comprising a pivoted frame, a slotted lever and a rod connecting such frame to such slotted lever and means for rocking such lever; means for moving the said rod along the slotted lever from a point opposite its fulcrum to a point distant therefrom and back again, such means comprising a controlling shaft and a cam mounted thereon and adapted to move such rod, whereby the latter is moved away from the fulcrum of the said slotted lever at the beginning of the first named revolution of the ring and returned to the fulcrum at the end of such revolution, means for controlling the needle thread tension, and means for clamping the needle thread at predetermined moments, whereby the shuttle thread loops formed on the descent of the needle outside the ring are drawn over the top side of such ring to the inside.

13. In a lock stitch sewing machine for making thread buttons, the combination of a cloth plate, a shuttle, a needle bar and a needle with means for holding a rigid ring between the shuttle and the needle bar with its geometrical axis substantially parallel to the needle bar, such means comprising a revoluble button feed disk journaled in the cloth plate, means for intermittently rotating said ring around its geometrical axis whereby such ring is caused to make substantially one complete revolution moving through a predetermined angle at each step, means for intermittently rotating the said button feed disk together with the ring whereby the ring is caused to make a plurality of further complete revolutions with another predetermined step, such means comprising a toothed ring, a pawl adapted to engage into such toothed ring, a cam mounted on a permanently revolving shaft of the machine and members connecting such cam to the said pawl, means for reciprocating the needle longitudinally, means for vibrating the needle radially to the ring whereby the needle is caused to descend alternately inside and outside the ring, means for rendering the vibrating means operative at the beginning of the first named revolution of the ring, means for rendering the vibrating means inoperative at the end of the first named revolution of the ring whereby the needle is caused to reciprocate longitudinally inside the ring only, means for controlling the needle thread tension, and means for clamping the needle thread at predetermined moments whereby the shuttle thread loops formed on the descent of the needle outside the ring are drawn over the top side of such ring to its inside.

14. In a lock stitch sewing machine for making thread buttons, the combination of a cloth plate, a shuttle, a needle bar and a needle with means for holding a rigid ring between the shuttle and the needle bar with its geometrical axis substantially parallel to the needle bar, such means comprising a revoluble button feed disk journaled in the cloth plate, means for intermittently rotating the said ring around its geometrical axis whereby such ring is caused to make substantially one complete revolution moving through a predetermined angle at each step, means for intermittently rotating the said button feed disk together with the ring through a plurality of further complete revolutions, such means comprising a pinion on the button feed disk, a toothed ring adapted to revolve such pinion, a long stroke pawl adapted to engage with such toothed ring, a cam mounted on a permanently revolving shaft of the machine, and a link and lever gearing connecting such long stroke pawl to the said cam, and further a short stroke pawl adapted to engage with such toothed ring, means for reciprocating the said short stroke pawl, means for throwing alternately into operation the long stroke pawl and the short stroke pawl, means for reciprocating the needle longitudinally, means for vibrating the needle radially to the ring whereby the needle is caused to descend alternately inside and outside the ring, means for rendering the vibrating means operative at the beginning of the first named revolution of the ring, means for rendering the vibrating means inoperative at the end of the first named revolution of the ring, whereby the needle is caused to reciprocate longitudinally inside the ring only, means for controlling the needle thread tension, and means for clamping the needle thread at predetermined moments whereby the shuttle thread loops formed on the descent of the needle outside the ring are drawn over the top side of such ring to its inside.

15. In a lock stitch sewing machine for making thread buttons, the combination of a cloth plate, a shuttle, a needle bar and a needle with means for holding a rigid ring between the shuttle and the needle bar with its geometrical axis substantially parallel to the needle bar, such means comprising a revoluble button feed disk journaled in the cloth plate, means for intermittently rotating the said ring around its geometrical axis whereby such ring is caused to make substantially one complete revolution moving through a predetermined angle at each step, means for intermittently rotating the said button feed disk together with the ring through a plurality of further complete revolutions, such means comprising a pinion on the button feed disk, a toothed ring adapted to revolve such pinion, a long stroke pawl adapted to engage with such toothed ring, a cam mounted on a permanently revolving shaft of the machine, and a link and lever gearing connecting such long stroke pawl to the said cam, and further a short stroke pawl adapted to engage with such toothed ring, means for reciprocating the said short stroke pawl, means for throwing alternately into operation the long stroke pawl and the short stroke pawl, such means comprising a controlling shaft and cams mounted thereon, means for reciprocating the needle longitudinally, means for vibrating the needle radially to the ring whereby the needle is caused to descend alternately inside and outside the ring, means for rendering the vibrating means operative at the beginning of the first named revolution of the ring, means for rendering the vibrating means inoperative at the end of the first named revolution of the ring, whereby the needle is caused to reciprocate longitudinally inside the ring only, means for controlling the needle thread tension, and means for clamping the needle thread at predetermined moments, whereby the shuttle thread loops formed on the descent of the needle outside the ring are drawn over the top side of such ring to its inside.

16. In a lock stitch sewing machine for making thread buttons, the combination of a cloth plate, a shuttle, a needle bar and a needle with means for holding a rigid ring between the shuttle and the needle bar with its geometrical axis substantially parallel to the needle bar, such means comprising a revoluble button feed disk journaled in the cloth plate, means for intermittently rotating the said ring around its geometrical axis whereby such ring is caused to make substantially a complete revolution moving through a predetermined angle at each step, means for intermittently rotating the said button feed disk together with the ring through a plurality of further complete revolutions, such means comprising a pinion on the button feed disk, a spur toothed ring adapted to revolve such pinion, a long stroke pawl and a short stroke pawl adapted to engage with such spur toothed ring, means for reciprocating the said pawls, means for forcing such pawls between the spur teeth of the spur toothed ring and for withdrawing them therefrom, such means comprising cams on continuously revolving shafts of the machine, means for throwing alternately into operation the long stroke pawl and short stroke pawl, means for reciprocating the needle longitudinally, means for vibrating the needle radially to the ring whereby the needle is caused to descend alternately inside and outside the ring, means for rendering the vibrating means operative at the beginning of the first named revolution of the ring, means for rendering the vibrating means inoperative at the end of the first named revolution of the ring, whereby the needle is caused to reciprocate longitudinally inside the ring only, means for controlling the needle thread tension, and means for clamping the needle thread at predetermined moments, whereby the shuttle thread loops formed on the descent of the needle outside the ring are drawn over the top side of such ring to its inside.

17. In a lock stitch sewing machine for making thread buttons, the combination of a shuttle, a needle bar and a needle with means for holding a rigid ring between the needle bar and the shuttle with its geometrical axis substantially parallel to the needle bar, means for intermittently rotating such ring around its geometrical axis whereby such ring is caused to make substantially one complete revolution moving through a predetermined angle at each step, means for intermittently rotating such ring around its geometrical axis whereby the said ring is caused to make a plurality of further complete revolutions, means for reciprocating the needle longitudinally, means for vibrating the needle radially to the ring whereby the needle is caused to descend alternately inside and outside the ring, means for rendering the vibrating means operative at the beginning of the first named revolution of the ring, means for rendering the vibrating means inoperative at the end of the first named revolution of the ring, whereby the needle is caused to reciprocate longitudinally inside the ring only, a needle thread brake comprising a light brake spring and a strong brake spring, means for throwing into and out of operation the said strong brake spring at the beginning and at the end respectively of the first mentioned revolution of the ring, such means comprising a controlling shaft and a cam mounted thereon, means for clamping the needle thread at predetermined moments whereby the shuttle thread loops formed on the descent of the needle outside the ring are drawn over the top side of such ring to its inside.

In testimony whereof, I affix my signature, in presence of two witnesses.

HEINRICH LAULA.

Witnesses:
　ARTHUR BAUMANN,
　AUGUST FUGGER.